Figure 1:
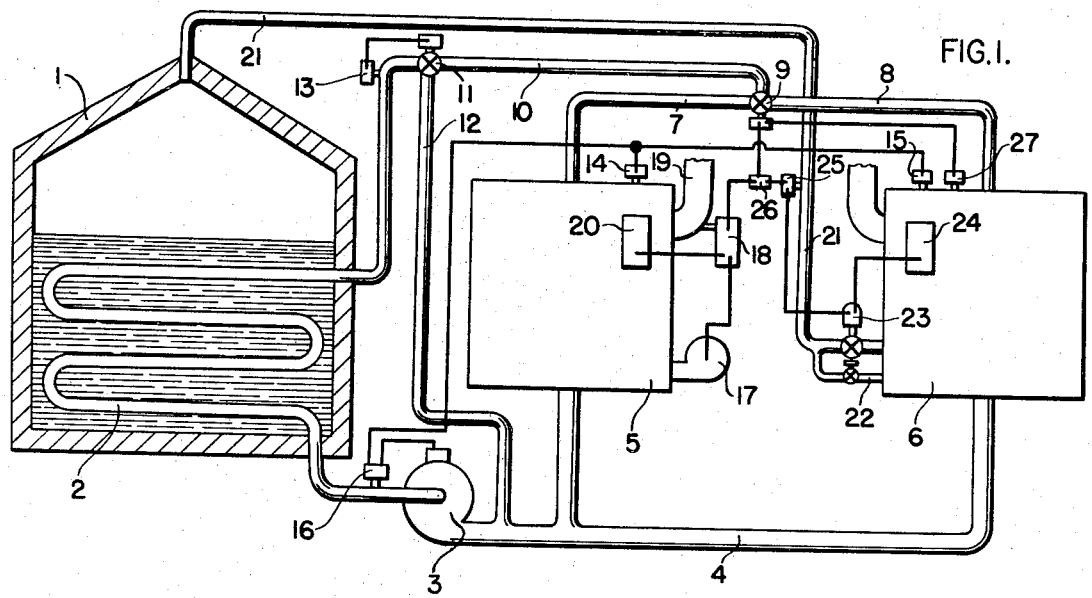

May 9, 1944.                W. W. WOODWARD                2,348,670
                              CONTROL SYSTEM
                           Filed Sept. 6, 1940

INVENTOR.
WALLACE W. WOODWARD
BY C. B. Spangenberg
ATTORNEY

Patented May 9, 1944

2,348,670

UNITED STATES PATENT OFFICE 2,348,670

CONTROL SYSTEM

Wallace W. Woodward, Chicago, Ill., assignor to
The Brown Instrument Company, Philadelphia,
Pa., a corporation of Pennsylvania Application September 6, 1940, Serial No. 355,649

17 Claims. (Cl. 210—2)

The present invention relates to control systems, and more particularly to systems for treating sludge in sewage treating plants.

In sewage treatment the sludge is heated by circulating hot water through pipes that are placed in the sludge tank, and as the heating continues a combustible gas is generated. When the process is started some source of heat such as an oil fired boiler is used to heat the water that is pumped through the sludge tank. After the process has continued enough for gas to be generated by the sludge a gas fired boiler using this gas as fuel is used to heat the treating water. It has been the custom in the past to change from the oil fired boiler to the gas fired boiler by hand when the gas reached some desired pressure. It has also been the custom to manually actuate the valves which control the passage of the treating water through either the oil or gas boiler, shifting from the oil to the gas boiler only after the water in the gas boiler has reached some predetermined temperature.

It is an object of the present invention to automatically control the treatment of sludge in a sewage treatment plant. It is a further object of the invention to automatically control the supply of water to a sludge tank in response to variables in the process.

In following my invention the system is automatically shifted from the oil to the gas boiler and back again in response to the pressure of the generated gas. At the same time the temperature of the water being forced through the sludge tank is maintained between predetermined limits.

The various features of novelty which characterize my invention are pointed out with particularity in the claims annexed to and forming a part of this specification. For a better understanding of the invention, however, its advantages and specific objects obtained with its use, reference should be had to the accompanying drawing and descriptive matter in which I have illustrated and described a preferred embodiment of the invention.

Figure 2:
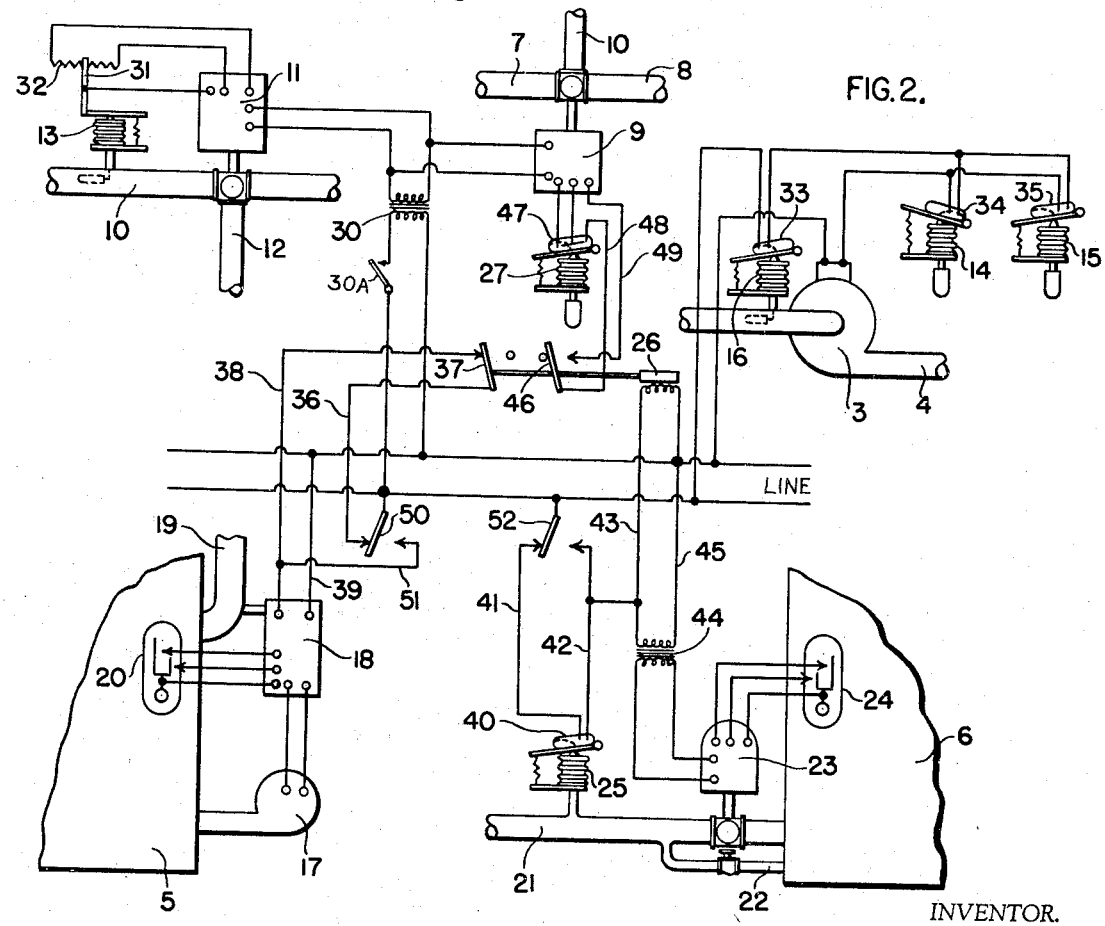

In the drawing:

Fig. 1 is a diagrammatic showing of the arrangement of the various units which go to make up a sludge treating system; and Fig. 2 is a wiring diagram showing the manner in which the various control units are connected together.

Referring to Figure 1, there is shown a sludge tank 1, the contents of which are heated by means of hot water circulated through a coil of pipe 2. The water is circulated by a motor driven pump 3 that drives the water through the coil and a pipe 4 to either an oil fired boiler 5 or a gas fired boiler 6. After the water is heated it goes through pipes 7 or 8, past a three-way, motor operated valve 9 into a pipe 10 and back to the heating coil 2. Located in the pipe 10 is a three-way, motor operated valve 11 that controls the supply of water flowing to the coil 2 by admitting into the pipe 10 cool water from a by-pass line 12 from the pump 3. The valve 11 is controlled in accordance with the temperature of the water leading to the coil 2 as measured by a thermostat 13 located in the pipe. If the water is too hot the valve 11 is adjusted to admit a larger proportion from the by-pass line 12. The pump 3 is operated in response to the temperature in the boilers 5 and 6 as measured by thermostats 14 and 15, respectively, and in response to the temperature of the water leaving the coil 2 as measured by a thermostat 16.

When the systems first starts up, the treating water is heated by the oil burning boiler 5. This boiler is provided with a burner 17 that is controlled by a well known type of controller 18 which is responsive to the temperature of the stack 19 and the temperature of the water as measured by a thermostat 20. After the sludge has been heated for sometime it begins to generate a combustible gas that is used as fuel for the gas fired boiler 6. This gas is collected in the top of the tank 1 and is fed through a pipe 21 to the boiler 6. The pipe 21 has a small branch 22 leading to the boiler to supply a pilot flame. Pipe 21 is also provided with a motor driven valve 23 that is operated in response to the temperature of the boiler as measured by a thermostat 24 to control the operation of valve 23 and thereby the supply of gas.

Since it is necessary or desirable to have the gas supply for boiler 6 under some pressure before the boiler begins to operate a pressure responsive device 25 is attached to the pipe 21 and serves to prevent operation of the boiler until the gas has reached some desired pressure. This pressure responsive device 25 simultaneously operates a relay 26 that acts to shut down the boiler 5 and to connect circuits so that the valve 9 will be operated to disconnect pipes 7 and 10 and to connect pipes 8 and 10 when the temperature of the water in boiler 6 has reached a desired value as measured by a thermostat 27.

The detail operation of the system will now be described in connection with the wiring diagram of Figure 2. The motor for valve 11 is energized through a transformer 30 from the line. This motor is of a well known modulating type and is run in one direction or the other an amount depending upon the direction and amount of movement of a slider 31 that is moved by the thermostat 13 across a resistance 32. The valve 11 is thereby adjusted to let more or less cool water from pipe 12 into pipe 10 so that the water going to the pipe coil 2 will be at some predetermined temperature. The energization of transformer 30 is controlled by switch 30A.

Motor driven pump 3 is energized direct from the line when the water in either of the boilers 5 or 6 is hot enough and when the water coming from coil 2 is below a predetermined temperature. This operation is used in order to prevent cold water from being pumped from the boilers through the coil 2 and in order to prevent water being withdrawn from the coil until its heat has been extracted by the sludge. This operation is obtained by providing the thermostat 16 with a switch 33 that is opened when the return water is too hot and providing the thermostats 14 and 15 with switches 34 and 35, respectively, that are closed when the temperature of the water in boilers 5 and 6, respectively, reaches a desired value. Switches 34 and 35 are connected in parallel and these switches are connected in series with the pump motor and switch 33. Therefore, when switch 33 and one of switches 34 or 35 is closed the pump will be working.

Assume, for example, that the system has just been started up and that boiler 5 is heating the water. The controller 18 is energized from one side of the line through conductor 36, switch 37 of relay 26, conductor 38 and through conductor 39 to the other side of the line. As the temperature in the boiler 5 varies the thermostat 20 will open and close its contacts to cause controller 18 to operate the oil burner 17 in a well known fashion. In this manner the water in coil 2 is heated while the sludge generates gas.

As the gas pressure in tank 1 increases it will also be increased in pipe 21 until the pressure responsive device 25 is actuated to close its switch 40. This simultaneously energizes the relay 26 from one side of the line through conductors 41, 42, 43 and the relay coil to the other side of the line and energizes the primary of a transformer 44 from one side of the line through conductors 41, 42, 43, the transformer winding and conductor 45 to the other side of the line. The first of these operations causes the relay 26 to open switch 37 to deenergize the oil burner controller 18 and stop the oil burner. Relay 26 also closes a second switch 46 for a purpose to be described below. The second of the operations energizes transformer 44 to supply power to the motor of gas valve 23 in pipe 21. Thereafter this valve is controlled in accordance with the temperature of boiler 6 as measured by the thermostat 24. As the thermostat opens and closes its contacts the valve motor is run to open or close the valve and thereby adjust the fuel supply to boiler 6.

While the oil burner is operating, the switch 46 of relay 26 and a double throw switch 47 on the thermostat 27 are in positions shown. With this position of the parts the motor of valve 9, which is energized from transformer 30, has been run to a position in which pipes 7 and 10 are in communication. When, however, relay 26 is energized the switch 46 connects wires 48 and 49 so that a circuit is prepared for the motor of valve 9 to run in a direction to connect pipes 8 and 10. Therefore, when the boiler 6 has been heated up enough for the thermostat 27 to tilt switch 47 to close the right-hand contacts the valve will be run to connect pipes 8 and 10. Because of the use of thermostat 27 cold water from the gas boiler is not pumped through the pipe coil. During the time that the gas boiler is heating up the now cooling oil boiler supplies the hot water and when the oil boiler is again started the valve 9 will not be shifted until the gas boiler is cool enough for the thermostat 27 to close the contacts in the left end of switch 47. While the gas boiler is cooling down the oil boiler is heating up so that pipe 7 will not be connected to pipe 10 while the water in boiler 5 is cold.

The oil boiler 5 may be run at any time by manually moving switch 50 in conductor 36 to the right into engagement with conductor 51. This shunts out the relay 26. In a similar manner the gas boiler 6 may be operated at any time by moving a switch 52 in conductor 41 to the right and connecting the line directly with conductor 42. This shunts out the pressure responsive device 25.

From the above detail description it will be seen that I have provided a control system for the hot water used in treating sludge in sewage treatment plants. This system is provided with controls which automatically shift the heat supply from one type of boiler to another in accordance with the amount of gas generated by the sludge. The system is also provided with controls that insure an ample supply of water at the correct temperature.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that in some cases certain features of my invention may sometimes be used to advantage without a corresponding use of other features.

Having now described my invention, what I claim as new and desire to secure by Letters Patent is:

1. In a sewage treating system in which the sludge is heated by hot water passed through a coil of pipe that is in contact with the sludge, the combination of a plurality of separate heating means for the water used in the coil, one of said heating means normally heating the water, and means operative in response to a physical condition of a gas generated by the heated sludge to shut off said one heating means and start the other.

2. In a control system in which a gas is generated as a result of subjecting material to heat and in which there is provided a plurality of heat supplying means for the material one of which normally acts to supply heat to the material, the combination of means responsive to a physical condition of the gas, mechanism operated by said means to shut off the heat supplying means which normally acts to supply heat to said material, and other mechanism operated by said responsive means to start another of the heat supplying means.

3. In a control system for the heating of a fluid, the combination of a plurality of heating units operative to supply heat to said fluid, the supply of heat to said fluid operating to generate a substance, means responsive to the temperature of said fluid to control the operation of one of said heating units, means responsive to a physical condition of the generated substance to stop said one heating unit and start another and means responsive to the temperature of the fluid to control the second heating unit.

4. In a control system adapted to supply a heated fluid to a place in which a process is being carried out, a plurality of heating means for said fluid, means to direct fluid from either of said heating means to said place, one of said heating means normally serving to supply the necessary heat, means responsive to a physical condition of a product of said process to automatically turn off one of said heating means and turn on the other, and means responsive to the heat of the fluid in said other heating means to so operate said directing means to direct the fluid from the second heating means to said place.

5. In a control system in which a heated fluid is circulated through a treating chamber, means to heat said fluid, means to circulate said fluid through the treating chamber and heating means, a by-pass for said fluid around said heating means, means jointly responsive to temperature of said fluid in said heating means and the fluid leaving said chamber to control said circulating means, and means responsive to temperature of the fluid entering said chamber to control flow of the fluid through said by-pass.

6. In a control system in which a fluid is circulated through a treating chamber and a plurality of means operating alternately on the fluid to change the temperature thereof, and in which a pump is provided to circulate the fluid through the treating chamber and temperature changing means, the combination of means to control individually the operation of the temperature changing means, and means to control the operation of the pump comprising a first device responsive to the temperature of the fluid leaving the chamber and a second device and a third device responsive respectively to the temperature of the fluid in the temperature changing means.

7. In a sewage control system in which a heated fluid is circulated through a treating tank, the combination of a plurality of alternately operative heating means for the fluid, circulating means to circulate said fluid through the treating tank and one of said heating means, means responsive to a predetermined temperature in one of said heating means and to a predetermined temperature of the fluid leaving said treating tank to control said circulating means and means responsive to the operation of one of said heating means to direct the fluid through one or the other of said heating means.

8. In a sewage control system in which a heated fluid is circulated through a treating tank, the combination of a plurality of heating means for the fluid, means to direct fluid from one or the other of said heating means alternately to the tank, and means responsive to the operation of one of said heating means to adjust said directing means to cause fluid to flow from that heating means to the tank.

9. In a control system in which a heating fluid is circulated through a treating tank, the combination of a plurality of heating means for said fluid, a valve operable in one position to direct fluid from one of said heating means to said tank, and in another position to direct fluid from the other heating means to said tank, a supply of fuel for one of said heating means, produced as a result of the action of the fluid in said tank, and means responsive to said supply of fuel to control the operation of said valve.

10. In a control system in which a heating fluid is circulated through a heating tank, the combination of a plurality of heating means for said fluid, a valve to direct the fluid from one or the other of said heating means to the treating tank, a supply of fuel for one of said heating means, produced as a result of the action of the fluid in said tank, means responsive to the supply of fuel to control the operation of both of said heating means, and means jointly responsive to said supply of fuel and the temperature of the fluid heated by the heating means to which said fuel is supplied to control the operation of said valve.

11. In a control system in which a fluid is to be circulated through a treating tank, the combination of a temperature changing means, circulating means to circulate the fluid through the tank and the temperature changing means, a by-pass for the fluid whereby it may be returned to the tank without going through the temperature changing means, means responsive to the temperature of the fluid going from the tank and to the temperature of the fluid in the temperature changing means to control the circulating means and means responsive to the temperature of the fluid going to the tank to control the amount of fluid going through said by-pass.

12. In a control system in which a fluid is circulated through a treating tank having a substance to be treated in it and in which a combustible gas is generated in the tank as a result of the treatment of the substance by the fluid, the combination of a first fluid temperature changing means supplied with fuel from an external source and a second fluid temperature changing means supplied with the combustible gas generated in the tank as fuel, means to transfer the gas from said tank to said second fluid temperature changing means, said first temperature changing means normally operating, and means responsive to the pressure of the generated gas in the tank to terminate the operation of said first temperature changing means and start the operation of the second.

13. In a control system in which a treating fluid is circulated through a tank, the combination of a plurality of means to change the temperature of said fluid, a circulating system for said fluid comprising the tank, one or the other of said temperature changing means and a by-pass around said temperature changing means, means responsive to the temperature of the fluid in one of said temperature changing means to control the passage of fluid through said temperature changing means or the other temperature changing means, and means responsive to the temperature of the fluid supplied to the tank to control the proportion of fluid used from the temperature changing means and the proportion used from the by-pass connection.

14. In a sewage treating system in which sludge is treated in a closed tank and a combustible gas is generated as a result of the treatment, a coil of pipe passing through said tank in contact with the sludge, means to force a heated liquid through said pipe, the heat dissipated from said liquid acting on the sludge to generate the gas, a plurality of heaters to heat said liquid, one of said heaters normally operating and being supplied with fuel from an external source, another of said heaters being supplied with the gas generated in said tank, means to pipe the gas from said tank to said other heater, and means responsive to the pressure of the generated gas to shut down said one heater and start up said other heater.

15. In a sewage treating system in which sludge is treated in a closed tank and a combustible gas is generated as a result of the treatment, a coil of pipe passing through the sludge in the tank, means to force a heated liquid through said pipe, the heat of the liquid serving to generate the gas, a first heating means serving to heat said liquid and fired with fuel from an external source, a second heating means for heating the liquid and fired from the gas generated in the tank, means responsive to the pressure of the gas generated in the tank operative to start said second heating means and stop said first heating means, and means responsive to the temperature of the fluid in said coil leaving said tank and to the temperature of the fluid in said heating means then in action to control the operation of said forcing means.

16. In a control system in which a heated fluid is circulated through a treating chamber and in which a combustible gas is generated, the combination of means to circulate the fluid through said chamber, a first means to heat said fluid, said heating means being fired by an external source of fluid, a second means to heat said fluid, said second heating means being fired from the gas produced in said treating chamber, said first heating means normally supplying the heat for said fluid, and means responsive to a physical condition of the gas generated in the treating chamber to start the operation of said second heating means and stop the operation of the first heating means.

17. In a sewage treatment system in which a combustible gas in generated during the treatment the combination of a closed tank in which said treatment occurs, a coil of pipe in said tank through which a heating fluid is forced, a plurality of fluid heating means connected to said coil of pipe, one of said heating means being fired by an external source of fuel, the other heating means being fired by the combustible gas, a connection for said gas between said tank and said said other heater, said one heater normally operating to heat the fluid, means responsive to the attainment of a predetermined pressure of the gas to start operation of said other heating means and stop said one heating means, means to force said fluid through said coil of pipe and heating means, and means responsive to the attainment of a predetermined temperature by the fluid in said other heating means to direct fluid from said one heating means to said other heating means.

WALLACE W. WOODWARD.